(12) United States Patent
Baldwin et al.

(10) Patent No.: US 8,487,196 B1
(45) Date of Patent: Jul. 16, 2013

(54) BOX CONNECTOR FOR ELECTRICAL CABLE

(75) Inventors: Jeffrey P. Baldwin, Phoenix, AZ (US); John Klein, Gilbert, AZ (US); Richard L. Cleghorn, Tempe, AZ (US); Ivan Dieterle, Tempe, AZ (US); Yani Deros, Phoenix, AZ (US); Marcus J. Shotey, Scottsdale, AZ (US)

(73) Assignee: Hubbell Incorporated, Shelton, CT (US)

( * ) Notice: Subject to any disclaimer, the term of this patent is extended or adjusted under 35 U.S.C. 154(b) by 582 days.

(21) Appl. No.: 12/825,153

(22) Filed: Jun. 28, 2010

Related U.S. Application Data

(60) Provisional application No. 61/220,906, filed on Jun. 26, 2009, provisional application No. 61/322,468, filed on Apr. 9, 2010.

(51) Int. Cl.
*H01R 13/502* (2006.01)
(52) U.S. Cl.
USPC .......................................................... 174/562

(58) Field of Classification Search
USPC ................. 174/520, 552, 562, 650, 655, 659, 174/660, 664, 665, 666, 669
See application file for complete search history.

(56) References Cited

U.S. PATENT DOCUMENTS

| | | |
|---|---|---|
| 1,843,201 A | 2/1932 | Buchanan |
| 3,104,120 A | 9/1963 | Myers |
| 4,468,535 A | 8/1984 | Law |
| 6,083,040 A | 7/2000 | Mosquera |
| 6,476,319 B1 | 11/2002 | Shemtov |
| 6,827,604 B1 | 12/2004 | White |
| 6,831,227 B2 | 12/2004 | Weise et al. |
| 6,995,316 B1 | 2/2006 | Goto |
| 7,211,744 B2 | 5/2007 | Jorgensen |

*Primary Examiner* — Jeremy Norris
*Assistant Examiner* — Tremesha S Willis
(74) *Attorney, Agent, or Firm* — Alfred N. Goodman; Mark S. Bicks; Garrett V. Davis

(57) ABSTRACT

A box connector for cable comprises an annular connector in which one or more inwardly extending arms are formed. The inwardly extending arms are formed such that cable may be inserted in one direction, but cannot be pulled out in the other direction until the inwardly extending arms are released. In use, the box connector is inserted into an electrical box prior to inserting cable. Thereafter, cable is threaded into the electrical box. Once the cable is threaded into the electrical box, the cable is fixedly held via the inwardly extending arms.

16 Claims, 8 Drawing Sheets

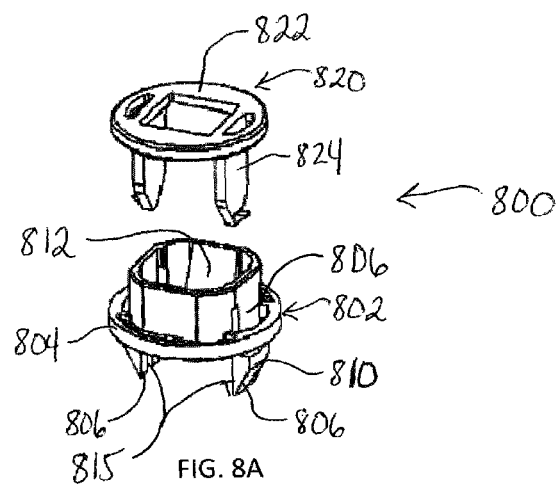
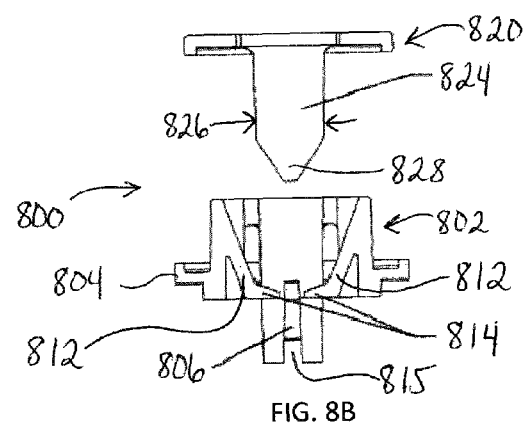
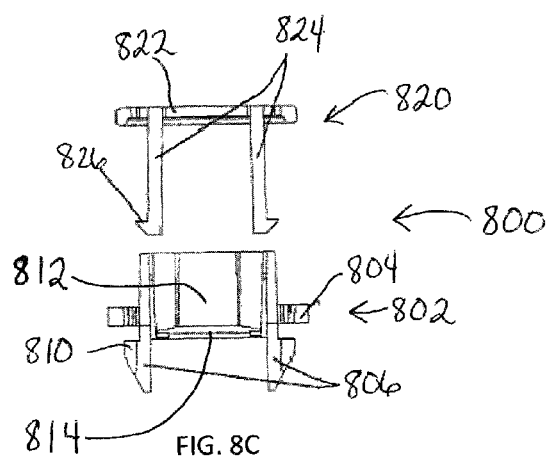

BOX CONNECTOR FOR ELECTRICAL CABLE

CROSS REFERENCE TO RELATED APPLICATIONS

This application claims the benefit of the filing date of U.S. Provisional Patent Application 61/220,906 entitled "NM Connectors" to Jeffrey Baldwin, et al. which was filed on Jun. 26, 2009, the contents of which are hereby incorporated herein by reference. This application also claims the benefit of the filing date of U.S. Provisional Patent Application 61/322,468 entitled "Box Connector for Electrical Wire" to Jeffrey Baldwin, et al. which was filed on Apr. 9, 2010, the contents of which are hereby incorporated herein by reference.

BACKGROUND

1. Technical Field

Aspects of this document relate generally to box connectors for electrical cable.

2. Background Art

Non-metallic sheathed electrical cable ("NM") is typically used in residential construction to distribute electricity from a distribution panel to individual switches, outlets, and the like. NM cable typically comprises a sheath that surrounds a plurality of individual solid-core wires, typically two to four wires that carry the hot, neutral, and ground wires used for residential electrical wiring. The individual switches, outlets, and the like are usually placed within an electrical box, which includes one or more openings that allow the NM to enter the box.

The wiring of homes is governed by electrical codes that regulate the manner in which electrical wiring is connected. Some electrical codes require electrical wiring (including NM cable) to be fixedly held as it passes through the wall. In addition, some electrical boxes are metal and the openings of the box may be sharp, posing a risk the electrical wiring may be cut or damaged by the sharp edge.

SUMMARY

Aspects of this document relate to electrical box connectors. In an implementation an electrical box connector may comprise a connector body having open proximal and distal ends defining a channel through the connector body, a plurality of flexible prongs extending from the distal end of the connector body, each prong comprising a sloped wall on its outer surface, at least one stop wall extending outwardly from a center axis of the connector body between the sloped walls and the proximal end of the connector body, at least two opposing arms extending inwardly of the connector body, each arm comprising a tooth edge thereon extending toward the center axis of the connector body, wherein the opposing arms and corresponding tooth edges are positioned on the connector body such that upon insertion of a cable through the channel of the connector, the tooth edges of the opposing arms releasably grip the cable to restrict its movement toward the distal or proximal end of the connector body, and at least one release mechanism operably coupled to at least one of the tooth edges such that through movement of the release mechanism toward the connector body or in the direction of the distal or proximal end of the connector body, the at least one of the tooth edges is moved away from the center axis of the connector body to release the restriction of the cable movement.

Particular implementations may comprise one or more of the following features. The release mechanism may be flexibly coupled to the connector body through one of the at least two opposing arms. The at least one release mechanism may comprise at least a first release mechanism and at least a second release mechanism each coupled to at least one of the tooth edges. Each of the first and second release mechanisms may be coupled to at least two tooth edges and the at least two tooth edges are each moved away from the center axis of the connector body by movement of an end of each of the first and second release mechanisms toward the connector body. The at least two tooth edges may each be moved away from the center axis of the connector body by movement of an end of each of the first and second release mechanisms toward the proximal end of the connector body. The electrical box connector may further comprise at least one extension tab extending from the proximal end of the connector body adjacent at least one of the two opposing arms. The opposing arms and corresponding tooth edges may be offset from each other about the center axis of the connector body so that they do not align with each other across the center axis. The at least one stop wall may comprise a plurality of rigid stop walls extending outwardly from the center axis of the connector body, each rigid stop wall extending directly from one of the plurality of flexible prongs.

In another implementation, an electrical box connector may comprise a connector body comprising an annular ring defining an opening therethrough, and at least two opposing prongs extending in a first direction from the annular ring, each prong comprising a sloped wall on its outer surface, at least one stop wall extending outwardly in relation to a center axis of the connector body between the sloped wall and the annular ring, and at least one arm flexibly coupled thereto and extending inwardly of the prong toward the center axis of the connector body, wherein each of the at least one arm comprises a tooth edge on its end closest the center axis of the connector body.

Particular implementations may comprise one or more of the following features. The at least two opposing prongs may each be flexibly coupled to each other through the annular ring such that external pressure applied to the at least two opposing prongs will flex the at least two opposing prongs toward each other. The at least one arm of each of the at least two opposing prongs may be angled away from the annular ring and toward the center axis of the connector body.

In another implementation, an electrical box connector may comprise a connector body defining an opening therethrough, the connector body comprising at least one wall extending radially from the connector body, a plurality of flexible prongs extending from the distal end of the connector body in a first direction, each prong comprising a sloped wall on its outer surface, a first tooth member extending inwardly from the connector body and angled toward a center axis of the connector body in a second direction opposite the first direction, and a second tooth member hingedly coupled to the connector body, opposing the first tooth member and angled toward the center axis in the second direction, wherein the first and second tooth members are positioned to cooperate to restrict movement of a cable in the first direction when the cable is extended through the opening in the connector body, but does not restrict movement of the cable in the second direction, and wherein the second tooth is configured for hinged moved from a first position wherein the tooth engages the cable extended through the opening to a second position wherein the second tooth does not engage the cable.

Particular implementations may comprise one or more of the following features. The at least one wall may comprise a plurality of rigid walls. The plurality of rigid walls may be separated by the plurality of flexible prongs.

In another implementation, an electrical box connector and release system may comprise a connector body defining an opening therethrough, the connector body comprising at least one wall extending radially from the connector body, a plurality of flexible prongs extending from the distal end of the connector body in a first direction, each prong comprising a sloped wall on its outer surface, and at least two flexible arms extending inward from the connector body and angled toward the distal end and a central axis of the connector body, each flexible arm comprising a tooth member at an end thereof, and a connector opener comprising an opener body defining an opening therethrough, at least one prong extending distally from the opener body, the opener prong comprising a width narrower than the opening through the connector body but wider than an opening between the tooth members at the ends of the at least two flexible arms, the at least one prong comprising a tapered end, wherein when the at least one prong is pushed between the at least two flexible arms of the connector body, the tapered distal end is sized to press against the at least two flexible arms and move them away from a central axis of the connector body.

Particular implementations may comprise one or more of the following features. The at least one prong of the connector opener may comprise at least two prongs. The connector body may further comprise at least one storage slot sized to receive the at least two prongs of the connector opener, wherein when the at least one storage slot receives the at least two prongs of the connector opener, the opening through the connector opener at least partially aligns with the opening through the connector body.

A method of connecting cable to an electrical box may comprise inserting an electrical box connector into an opening through a wall of the electrical box, releasably passing cable through a center opening of the electrical box connector from a proximal end of the connector to a distal end of the connector, gripping the cable with opposing teeth extending inward within the electrical box connector to restrict movement of the cable within the electrical box connector toward the proximal end, and releasing the cable from the teeth to permit the cable to move in the direction of the proximal end by separating the teeth without removing the electrical box connector from the wall of the electrical box.

Particular method implementations may comprise one or more of the following features. Separating the teeth may comprise separating the teeth by moving a release mechanism coupled to the teeth toward a central axis of the electrical box connector or in the direction of the proximal end. Separating the teeth may comprise inserting a connector opener comprising two prongs into the center opening of the electrical box connector to separate the teeth, the connector opener encircling the cable. Separating the teeth may comprise hingedly moving one of the teeth from an engaged position wherein the tooth engages the cable to a second disengaged position where the tooth does not engage the cable.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Embodiments and implementations will hereinafter be described in conjunction with the appended drawings, where like designations denote like elements, and:

FIG. 8A is an isometric view of a two-part electrical box connector;

FIG. 8B is a cross-sectional view of the two-part electrical box connector of FIG. 8A taken vertically through its inwardly extending arms;

FIG. 8C is a cross-sectional view of the two-part electrical box connector of FIG. 8A taken vertically through its prongs;

DESCRIPTION

This disclosure, its aspects and implementations, are not limited to the specific components or assembly procedures disclosed herein. Many additional components and assembly procedures known in the art consistent with the intended operation and assembly procedures for an electrical box will become apparent for use with implementations of an electrical box from this disclosure. Accordingly, for example, although particular components are disclosed, such components and other implementing components may comprise any shape, size, style, type, model, version, measurement, concentration, material, quantity, and/or the like as is known in the art for such implementing components, consistent with the intended operation of an electrical box.

Particular implementations of a box connector for electrical wiring may comprise an injection molded piece sized to fit into a hole in a stamped metal electrical junction box. Although the examples described involve NM cable, it will be clear to those of ordinary skill in the art that the electrical box connectors may be used with other residential and commercial wiring and cable as well.

Figure 12:
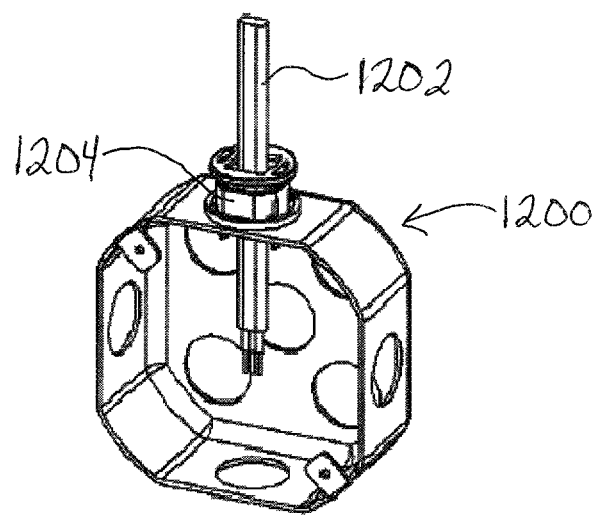
FIG. 12 is an isometric view of an electrical box comprising a wire being secured to the electrical box through an electrical box connector configured according to an embodiment disclosed.

FIGS. 1-5 illustrate a particular implementation of an electrical box connector 100 adapted for use with NM electrical cable. In particular, connector 100 may be formed as a single piece connector body with an open distal end 112 and an open proximal end 114 that defines a channel through the connector body. A plurality of flexible prongs 104 extend from the distal end 112 of the connector body 102. Two or more of the flexible prongs 104 comprises a sloped wall 105 on its outer surface. One or more stops, or rigid stops 110 extend outward from connector body 102 in a direction away from center axis 111. When the connector 100 is coupled to a wall of an electrical box 1200 (see, for example FIG. 12, with representative connector 1204), the flexible prongs 104 flex inward toward the center axis 111 by the sloped wall 105 slidably engaging the edges of the opening in the wall of the electrical box. When the connector 100 has been inserted into the opening in the wall far enough, the flexible prongs 104 flex outward so that the wall is trapped between the rigid stops 110 and the sloped walls 105 of the connector 100 to prevent the connector 100 from passing too far into the electrical box. Various connector ends of varying sizes may be created for varying hole sizes and shapes. For example, a square-shaped end with prongs could similarly be configured to allow for entry into a square opening, if one were used.

Figure 1:
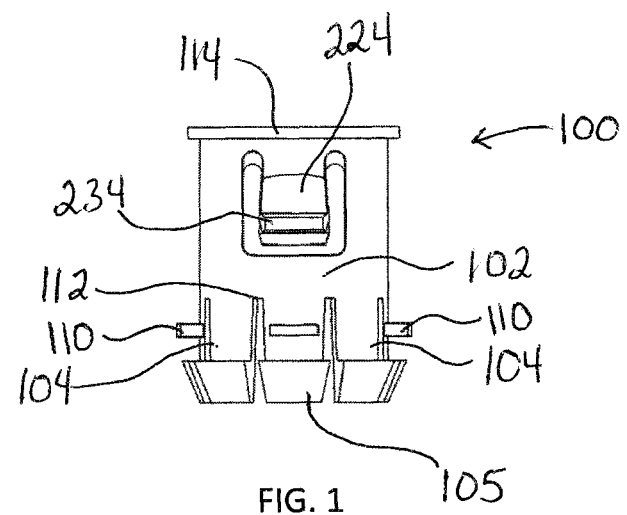
FIG. 1 is a top view of an electrical box connector.
Figure 2:
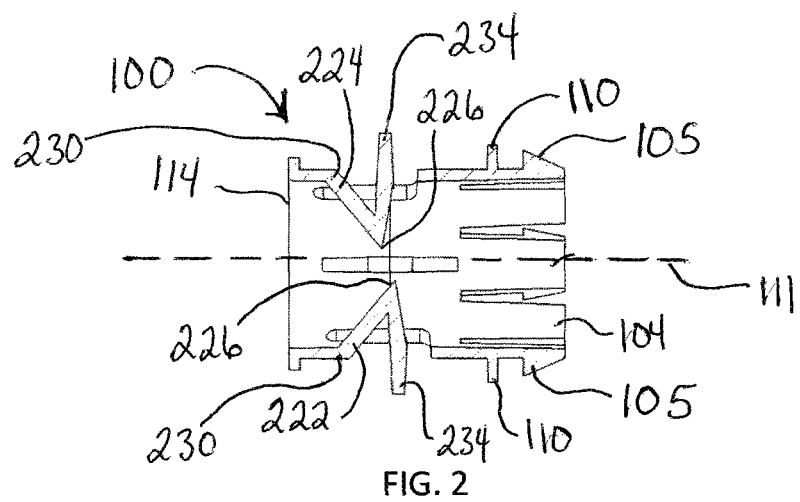
FIG. 2 is a cross-sectional view of an electrical box connector taken vertically front to back through the connector of FIG. 1.

With specific reference to FIG. 2, a cross-sectional view of the connector 100 is shown. At least two opposing arms 222, 224 extend inwardly of the connector body 102 and may be coupled to the connector body 102 near the proximal end 114 of the connector 100. Each inwardly extending arm 222, 224 comprises a tooth edge 226 extending toward the center axis of the connector body 102. When a cable 1202 is inserted into an electrical box 1200 through the channel of the connector body 102 (see FIG. 12, with representative connector 1204), the tooth edges 226 of the opposing arms 222, 224 releasably grip the cable 1202 to restrict its movement out of the box. For this particular implementation if the box connector 100 is inserted with its connector body 102 outside the electrical box, the tooth edges 226 would restrict movement of the cable in the proximal direction.

Figure 3:
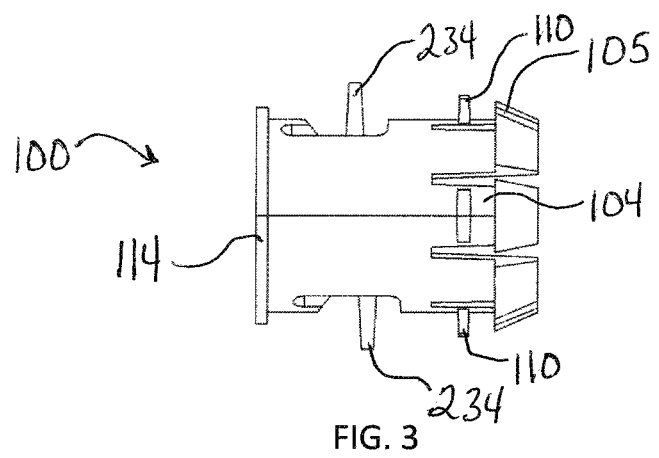
FIG. 3 is a side view of an electrical box connector.
Figure 4:
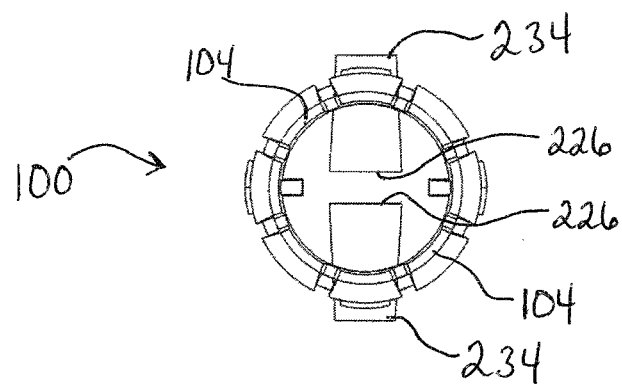
FIG. 4 is a view of an electrical box connector from the distal end of the connector.
Figure 5:
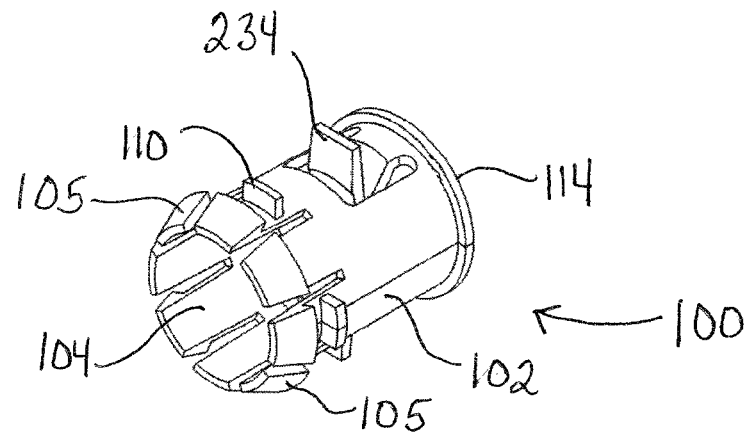
FIG. 5 is an isometric view of an electrical box connector.

First and second inwardly extending arms 222 and 224 include a first end 230 flexibly joined to the proximal end 114 of the connector body 102, a tooth edge 226 that extends into the connector body 102, and a release mechanism 234 that extends outside and away from the body of the connector. The release mechanism allows a user to release the connector's grip on the cable when the user manipulates the release mechanism 234. For this implementation, when the user pulls the release mechanisms 234 toward the proximal end of the connector body 102, the first and second inwardly extending arms 222 and 224 flex in relation to the connector body 102 at their first ends 230 and the tooth edges 226 move away from the center axis 111 of the connector body. FIGS. 3-5 show alternate views of connector 100.

When a wire is inserted into the electrical box through the opening in the connector body 102, the wire is gripped by the tooth edges 226 of inwardly extending arms 222 and 224. When the wire is being pushed into the box (in the direction from proximal end 114 toward distal end 112 of the connector—"distal direction"), the inwardly extending arms 222, 224 which are flexibly joined to the connector body 102 flex away from the wire and allow it to pass. If the wire is pulled or pushed in the opposite direction (from distal end 112 toward proximal end 114 of the connector—"proximal direction"), the tooth edges 226 of the respective inwardly extending arms 222 and 224 are sized and shaped to grip the wire and resist its movement in the proximal direction. In this way, the cable is easily installed into the electrical box, but is restricted from falling out or being pulled out of the box.

Note specifically in the embodiment illustrated in FIG. 2 that the tooth edges 226 associated with the opposing arms 222, 224, are not directly across from each other about the center axis 111, but are offset from each other. By offsetting the tooth edges 226 the gripping ability of the connector is increased and the likelihood of the cable being damaged is decreased. Also, in the particular embodiment illustrated in FIG. 1, the at least one rigid stop wall 110 comprises a plurality of rigid stop walls 110 and in this particular embodiment the rigid stop walls 110 are each positioned on a different prong 104. Alternatively, the rigid stop wall could be positioned at the distal end 112 of the connector body 102 or elsewhere on the connector 100 near the prongs.

Figure 6:
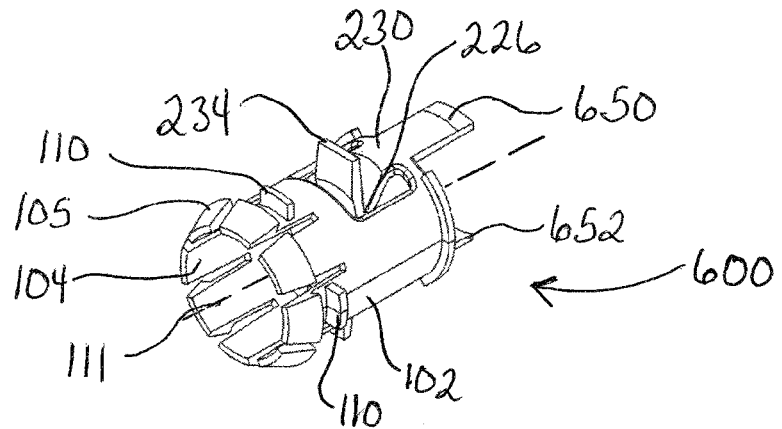
FIG. 6 is an isometric view of an alternative embodiment of an electrical box connector.
Figure 7:
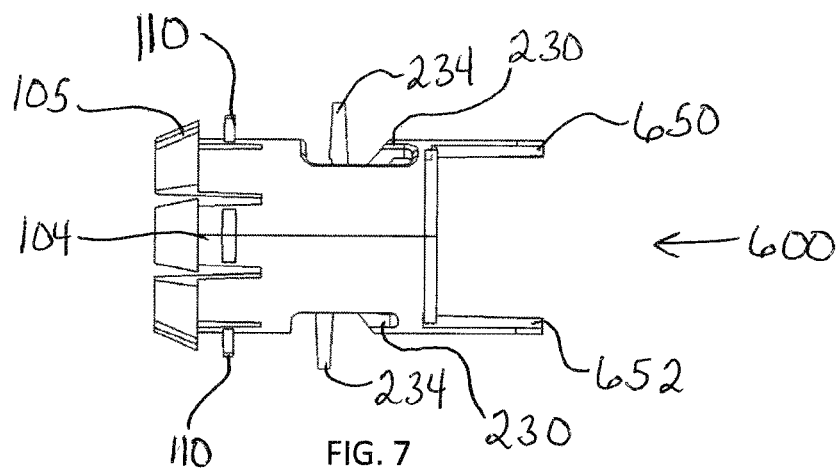
FIG. 7 is a side view of an alternative embodiment of an electrical box connector.

FIGS. 6 and 7 illustrate an additional embodiment of a connector similar in structure, function and operation to the embodiment illustrated in FIGS. 1-5. Duplicate recitation of similar parts will not be made here apart from reference to FIGS. 1-5 for those similarities. In this particular embodiment, however, the box connector 600 further comprises extended tabs 650 and 652. In addition to assisting the user to insert the box connector 600 into a hole in a side of an electrical box, extended tabs 650 and 652 may also function as a second or alternative release mechanism 650 and 652 such that when the user squeezes the extended tabs 650 and 652 toward the center axis 111 of the box connector 600, the teeth 226 associated with each of the inwardly extending arms will have a tendency to move away from the center axis 111 to thereby release the cable.

Figure 11A:
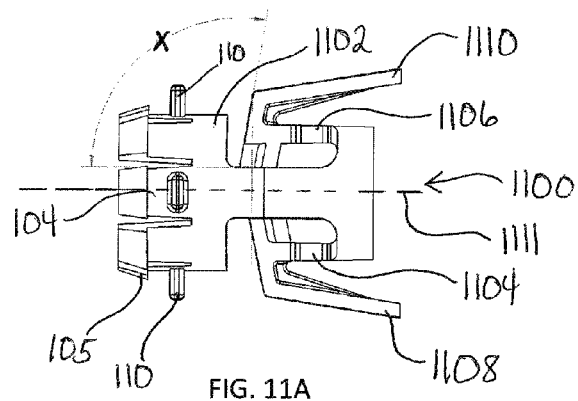
FIG. 11A is a first side view of yet another embodiment of an electrical box connector.
Figure 11B:
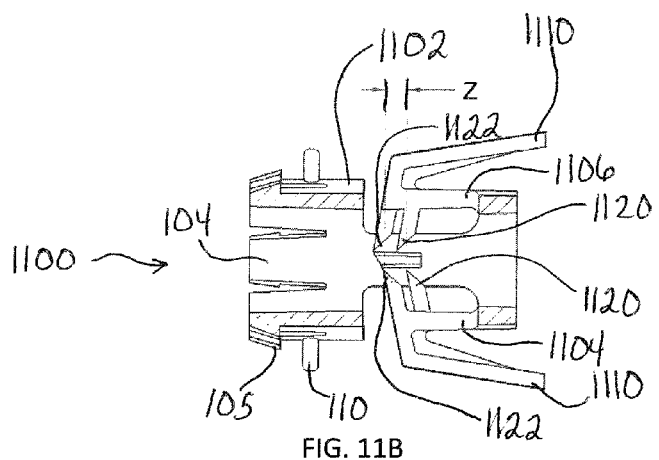
FIG. 11B is a cross-sectional view of the electrical box connector of FIG. 11A taken vertically through the inwardly extending arms.
Figure 11C:
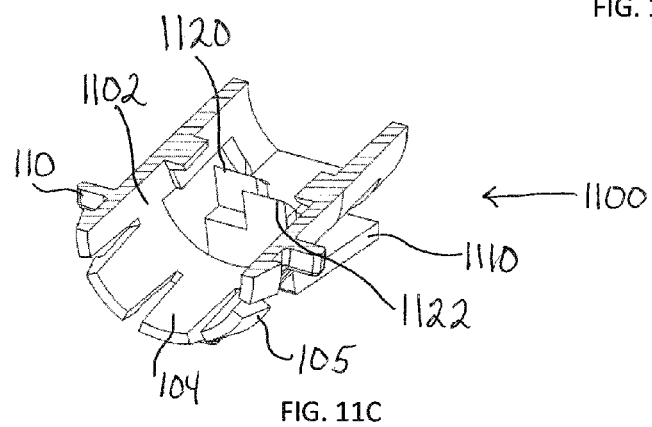
FIG. 11C is an isometric cross-sectional view of the electrical box connector of FIG. 11A taken vertically, 90 degrees rotated from the cross-section of FIG. 11B.

FIGS. 11A-11C illustrate another additional embodiment of a connector similar in structure, function and operation to the embodiment illustrated in FIGS. 1-5. Duplicate recitation of similar parts will not be made here apart from reference to FIGS. 1-5 for those similarities. In this particular embodiment, however, the at least two opposing arms 1104 and 1106 are coupled to the connector body 1102 and have release mechanisms 1108 and 1110 angled away from the central axis 1111 of the connector body 1102. Although only one tooth edge 1120, 1122 may be used for each opposing arm 1104 and 1106, in this particular implementation two tooth edges 1120 and 1122 are used for each opposing arm 1104 and 1106. Note that the two tooth edges 1120 and 1122 for each opposing arm 1104 and 1106 are offset from each other by a distance Z (FIG. 11B) in addition to being offset from the two tooth edges 1120 and 1122 of the opposing arm 1104 or 1106. Similar to the explanation provided in relation to the embodiment of FIGS. 1-5, by offsetting the two tooth edges 1120 and 1122 on the same arm the gripping ability of the connector is further increased. For the particular implementation illustrated in FIG. 11B, the two tooth edges 1120 and 1122 of the first arm 1104 are offset with a foremost tooth edge 1122 in a more distal position than the other tooth edge 1120 and the two tooth edges 1120 and 1122 of the second arm 1106 are offset with the foremost tooth edge 1120 in a more proximal position than the other tooth edge 1122 on that arm 1106. Additionally, the corresponding tooth edges on opposing arms 1104 and 1106 are offset from each other. By not placing corresponding opposing tooth edges 1120 and 1122 on opposing arms 1104 and 1106 directly across from each other, there is less likelihood of damaging the cable extended through the connector while still maintaining a strong grip on the cable.

For the particular implementation of FIG. 11, the release mechanisms 1108 and 1110 are set at an angle X from the center axis 1111 of the box connector body 1100. This angle also strengthens the structural strength of the connector in relation to the tooth edges' 1120 and 1122 ability to grip the cable, while still allowing the release mechanisms 1108 and 1110 to cause the tooth edges 1120 and 1122 to release the cable. As with any other embodiment illustrated herein, although there are two release mechanisms 1108 and 1110 illustrated, it is contemplated that in particular implementations the tooth edges 1120 and/or 1122 that are illustrated coupled to a flexible arm 1104 and 1106 may alternatively be coupled to a fixed arm or to an inner wall of the connector body 1102 and only one release mechanism may be used.

For the particular implementation of FIGS. 8A-8C, an embodiment of a releaseable electrical box connector system 800 is shown. A connector body 802 defines an opening through the box connector 800 and at least one rigid stop 804 extends radially from the connector body 802. A plurality of flexible prongs 806 extend from the distal end of the connector body 802 and each of one or more of those flexible prongs 806 may comprise a sloped wall 810 on its outer surface like the embodiments of FIGS. 1-5. At least two flexible arms 812 extend inward from the connector body 802 and are angled toward the distal end 808. Each flexible arm 812 comprises a tooth edge 814. Similar in function to previous embodiments described, when a cable is passed through the opening of the box connector 800, the tooth edges 814 of the opposing flexible arms grip the sides of the cable to restrict its movement in the proximal direction. Different from previously described embodiments, however, the flexible arms 812 are caused to move outward through a connector opener 820 being inserted between the flexible arms 812. The connector opener 820 comprises an opener body 822 defining an opening therethrough, and at least one prong 824 extending distally from the opener body 822. The opener prong comprises a width 826 that is narrower than the opening through the connector body 802, but wide enough to separate the flexible arms 812 when the connector opener 820 is inserted into the connector body 802. The tip 828 of the prongs 824 may be tapered to assist in inserting the prongs 824 between the flexible arms.

In use, the cable is inserted through both the connector opener 820 and the connector body 802. When the connector opener 820 is not being used to release the flexible arms 812, the connector opener 820 may be secured to the connector body 802 by prongs 826 engaging with entrapment grooves 815 on the prongs 806 of the connector body 802. When the entrapment groove 815 engages the prongs on the connector opener 820, the opening through the connector opener 820 at least partially aligns with the opening through the connector body 802.

Figure 9A:
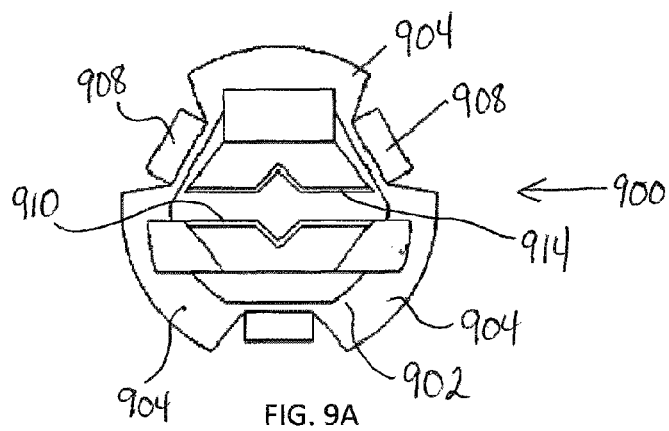
FIG. 9A is a view of an embodiment of an electrical box connector from the proximal end of the connector.
Figure 9B:
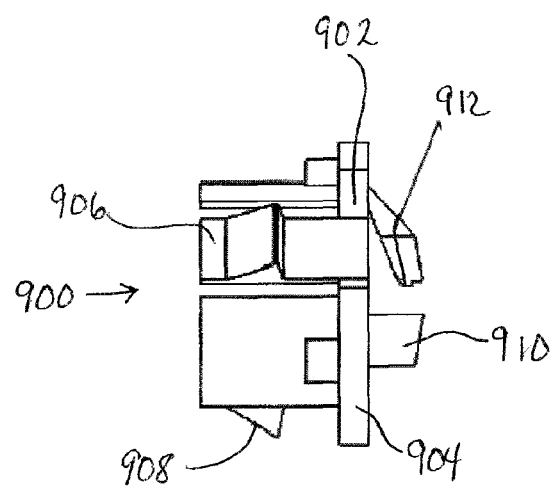
FIG. 9B is a first side view of the embodiment of the electrical box connector of FIG. 9A.
Figure 9C:
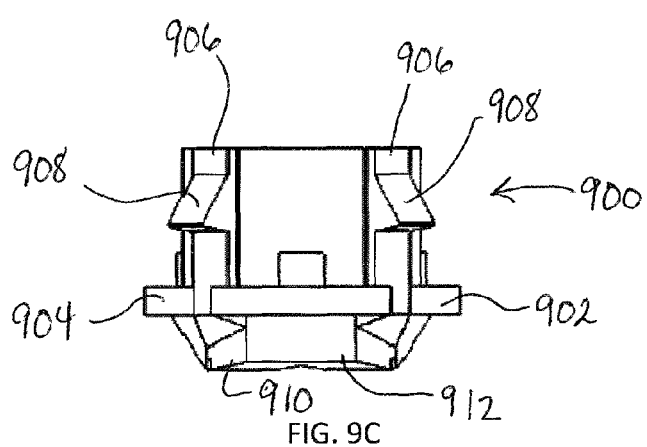
FIG. 9C is a second side view of the embodiment of the electrical box connector of FIG. 9A.

With reference to FIGS. 9A-9C, another alternate embodiment of an electrical box connector 900 is shown with a connector body 902 defining an opening therethrough. At least one rigid stop wall 904 extending radially from the connector body 902. A plurality of flexible prongs 906 extend from the distal end of the connector body 902 and at least one comprises a sloped wall 908 on its outer surface to assist in securing the connector 900 to an electrical box. Box connector 900 may be used with or without an opener. The embodiment illustrated in FIGS. 9A-9C comprises a fixed tooth edge 910 and a moveable tooth edge 912, such as through a living hinge 914, that allows the moveable tooth edge 912 to be moved from a first position in which it engages with a cable drawn through the connector 900, and a second position in which it disengages with the cable. Because the side of the moveable tooth edge 912 extends beyond the connector body 902 and is easily accessible, a tool may be inserted beneath the moveable tooth edge 912 to move the moveable tooth edge 912 to its second position. In most implementations, though it is not required, the moveable tooth edge 912 will be biased to its first position for securing the cable. In the particular implementation illustrated in FIGS. 9A-9C, the rigid stop wall 904 comprises a plurality of rigid stop walls 904 each separated by a flexible prong 906 extending from the connector body 902.

Figure 10A:
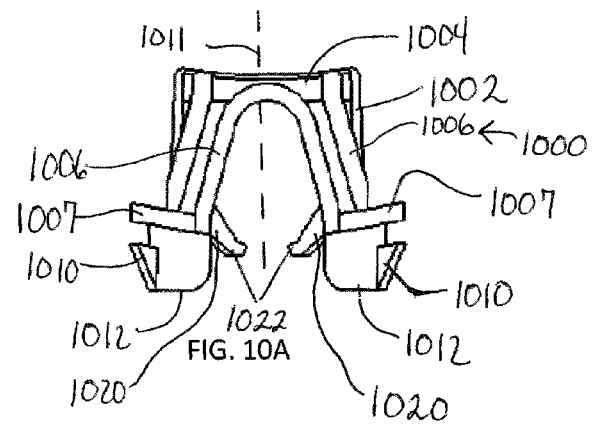
FIG. 10A is a first side view of another embodiment of an electrical box connector.
Figure 10B:
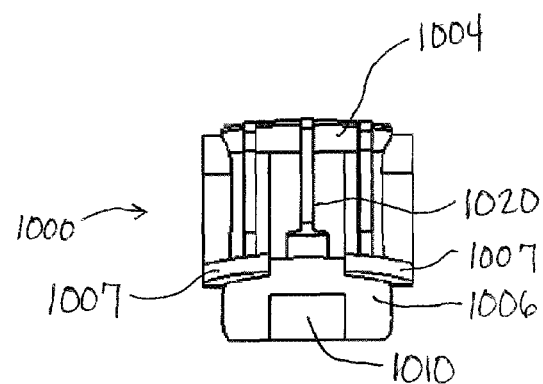
FIG. 10B is a second side view of the embodiment of the electrical box connector of FIG. 10A.
Figure 10C:
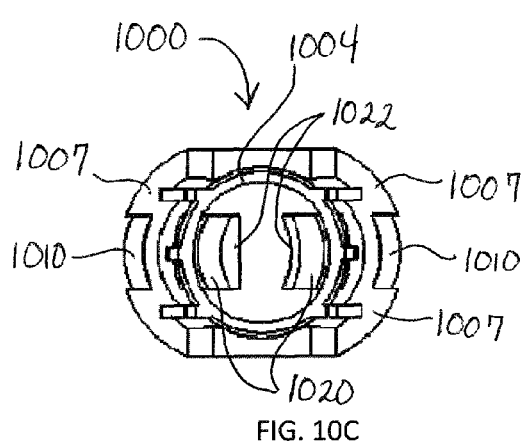
FIG. 10C is a view of the embodiment of the electrical box connector of FIG. 10A from the proximal end.

FIGS. 10A-10C illustrate another alternate embodiment of a releasable electrical box connector 1000. This particular implementation, like many others illustrated in the Figures, is molded as a single piece. Connector 1000 comprises a connector body 1002 comprising an annular ring 1004 with at least two prongs 1006 extending in a first direction away from the annular ring 1004. Each of the at least two prongs 1006 comprises a sloped wall 1010 on its outer surface at a distal end 1012 and a rigid stop wall 1007. Box connector 1000 also comprises an opening through the annular ring 1004. Each of the at least two prongs 1006 comprises at least one arm 1020 flexibly coupled thereto and extending inwardly of the prong 1006 toward the center axis 1011 of the connector body 1002. Each arm 1020 further comprises a tooth edge 1022 at its end.

In this particular implementation, the cable is permitted to freely move in both directions through the box connector 1002 until the box connector 1002 is installed on an electrical box. Once the prongs 1006 are compressed to couple the box connector 1002 to an electrical box, with a cable threaded through the connector 1002, the tooth edges 1022 are compressed toward the cable to grip it firmly to restrict its movement in one direction, but permit its movement in the other direction. The cable can be released for movement by again compressing the prongs 1006 and removing the box connector 1002 from the electrical box.

Various electrical box connectors described in this disclosure may be constructed of a variety of different materials, but a particular implementation contemplated is made as a single piece using injection molded plastic. The connector may have a variety of different sizes, such as having an opening of ½, ¾ or 1 inch. In one particular embodiment, the connector has a pull strength of 50 pounds using a #10, #12 or #14 gauge wire.

Although most of the embodiments and implementations of electrical box connectors 1204 described are contemplated specifically for insertion into a wall of an electrical box 1200 from the outside of the electrical box 1200 to preserve the precious space within the electrical box 1200, it is specifically contemplated that any of the embodiments may similarly be either simply coupled to the wall from the inside of the electrical box 1200, or in particular implementations reconfigured slightly to function by coupling to the inside of the wall but still permitting the releasable grip on the cable 1202 restricting its movement being pulled out of the electrical box 1200.

In places where the description above refers to particular implementations of a wire connector for an electrical box, it should be readily apparent that a number of modifications may be made without departing from the spirit thereof. The presently disclosed implementations are, therefore, to be considered in all respects as illustrative and not restrictive.

The implementations listed here, and many others, will become readily apparent to those of ordinary skill in the art from this disclosure. Those of ordinary skill in the art will readily understand the versatility with which this disclosure may be applied. It will be understood that implementations are not limited to the specific components disclosed herein, as virtually any components consistent with the intended operation of a method and/or system implementation for an electrical wire connector may be utilized. Implementations of electrical wire connectors for electrical boxes, and implementing components, may be constructed of a wide variety of materials known in the art of electrical boxes, wire and connectors. For example, the components may be formed of: metals; polymers such as thermoplastics (such as ABS, Fluoropolymers, Polyacetal, Polyamide; Polycarbonate, Polyethylene, Polysulfone, and/or the like); thermosets (such as Epoxy, Phenolic Resin, Polyimide, Polyurethane, Silicone, and/or the like), any combination thereof, and/or other like materials. Also, appropriate mounting fasteners, hardware and components may be provided. Those of ordinary skill in the art will readily be able to select appropriate materials and manufacture these products from the disclosures provided herein.

The concepts disclosed herein are not limited to the specific implementations shown herein. For example, it is specifically contemplated that the components included in a particular implementation of an electrical box may be formed of any of many different types of materials or combinations that can readily be formed into shaped objects and that are consistent with the intended operation of an electrical box. For example, the components may be formed of: rubbers (synthetic and/or natural) and/or other like materials; polymers and/or other like materials; plastics, and/or other like materials; composites and/or other like materials; metals and/or other like materials; alloys and/or other like materials; and/or any combination of the foregoing.

Some components defining connectors, although explained and shown as a single piece above, may be manufactured simultaneously and integrally joined with one another, while other components may be pre-manufactured or manufactured separately and then assembled with the integral components. Various implementations may be manufactured using conventional procedures as added to and improved upon through the principles described here. Components manufactured separately may then be coupled or removably coupled with the other integral components in any manner. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a weld, a fastener, any combination thereof, and/or the like for example, depending on, among other considerations, the particular material(s) forming the components.

It will be understood that implementations are not limited to the specific components disclosed herein, as virtually any components consistent with the intended operation of a method and/or system implementation for an electrical box may be utilized. Accordingly, for example, although particular component examples may be disclosed, such components may comprise any shape, size, style, type, model, version, class, grade, measurement, concentration, material, weight, quantity, and/or the like consistent with the intended operation of a method and/or system implementation for an electrical box may be used.

In places where the description above refers to particular implementations of an electrical box, it should be readily apparent that a number of modifications may be made without departing from the spirit thereof and that these implementations may be applied to other electrical boxes. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

We claim:

1. An electrical box connector comprising:
   a connector body having open proximal and distal ends defining a channel through the connector body;
   a plurality of flexible prongs extending from the distal end of the connector body, each prong comprising a sloped wall on its outer surface;
   at least one stop wall extending outwardly from the connector body between the sloped walls and the proximal end of the connector body;
   at least two opposing arms extending inwardly of the connector body, each arm comprising a tooth edge thereon extending toward the center axis of the connector body, wherein the opposing arms and corresponding tooth edges are positioned on the connector body such that upon insertion of a cable through the channel of the connector, the tooth edges of the opposing arms releasably grip the cable to restrict its movement toward the distal or proximal end of the connector body; and
   at least one release mechanism operably coupled to at least one of the tooth edges such that movement of the release mechanism toward the connector body or in the direction of the distal or proximal end of the connector body moves the at least one of the tooth edges away from the center axis of the connector body to release the cable movement restriction.

2. The electrical box connector of claim 1, wherein the release mechanism is flexibly coupled to the connector body through one of the at least two opposing arms.

3. The electrical box connector of claim 2, wherein the at least one release mechanism comprises at least a first release mechanism and at least a second release mechanism each coupled to at least one of the tooth edges.

4. The electrical box connector of claim 3, wherein each of the first and second release mechanisms is coupled to at least two tooth edges and the at least two tooth edges are each moved away from the center axis of the connector body by movement of an end of each of the first and second release mechanisms toward the connector body.

5. The electrical box connector of claim 3, wherein the at least two tooth edges are each moved away from the center axis of the connector body by movement of an end of each of the first and second release mechanisms toward the proximal end of the connector body.

6. The electrical box connector of claim 5, further comprising at least one extension tab extending from the proximal end of the connector body adjacent at least one of the two opposing arms.

7. The electrical box connector of claim 1, wherein the opposing arms and corresponding tooth edges are offset from each other about the center axis of the connector body so that they do not align with each other across the center axis.

8. The electrical box connector of claim 1, wherein the at least one stop wall comprises a plurality of rigid stop walls extending outwardly from the center axis of the connector body, each rigid stop wall extending directly from one of the plurality of flexible prongs.

9. An electrical box connector comprising:
 a connector body comprising an annular ring defining an opening therethrough; and
 at least two opposing prongs extending in a first direction from the annular ring, each prong comprising a sloped wall on its outer surface, at least one stop wall extending outwardly in relation to a center axis of the connector body between the sloped wall and the annular ring, and at least one arm flexibly coupled thereto and extending inwardly of the prong toward the center axis of the connector body, wherein each of the at least one arm comprises a tooth edge on its end closest to the center axis of the connector body.

10. The electrical box connector of claim 9, wherein the at least two opposing prongs are each flexibly coupled to each other through the annular ring such that external pressure applied to the at least two opposing prongs flexes the at least two opposing prongs toward each other.

11. The electrical box connector of claim 9, wherein the at least one arm of each of the at least two opposing prongs is angled away from the annular ring and toward the center axis of the connector body.

12. An electrical box connector comprising:
 a connector body defining an opening therethrough, the connector body comprising at least one wall extending radially from the connector body;
 a plurality of flexible prongs extending from the distal end of the connector body in a first direction, each prong comprising a sloped wall on its outer surface;
 a first tooth member extending inwardly from the connector body and angled toward a center axis of the connector body in a second direction opposite the first direction; and
 a second tooth member hingedly coupled to the connector body, opposing the first tooth member and angled toward the center axis of in the second direction;
 wherein the first and second tooth members are positioned to cooperate to restrict movement of a cable in the first direction when the cable is extended through the opening in the connector body, but does not restrict movement of the cable in the second direction; and
 wherein the second tooth is configured for hinged movement from a first position wherein the tooth engages the cable extended through the opening to a second position wherein the second tooth does not engage the cable.

13. The electrical box connector of claim 12, wherein the at least one wall comprises a plurality of rigid walls.

14. An electrical box connector and release system comprising:
 a connector body defining an opening therethrough, the connector body comprising at least one wall extending radially from the connector body, a plurality of flexible prongs extending from the distal end of the connector body in a first direction, each prong comprising a sloped wall on its outer surface, and at least two flexible arms extending inward from the connector body and angled toward the distal end and a central axis of the connector body, each flexible arm comprising a tooth member at an end thereof; and
 a connector opener comprising an opener body defining an opening therethrough, at least one prong extending distally from the opener body, the opener prong comprising a width narrower than the opening through the connector body but wider than an opening between the tooth members at the ends of the at least two flexible arms, the at least one prong comprising a tapered end;
 wherein when the at least one prong is pushed between the at least two flexible arms of the connector body, the tapered distal end is sized to press against the at least two flexible arms and move them away from a central axis of the connector body.

15. The electrical box connector and release system of claim 14, wherein the at least one prong of the connector opener comprises at least two prongs.

16. The electrical box connector and release system of claim 15, wherein the connector body further comprises at least one storage slot sized to receive the at least two prongs of the connector opener, wherein when the at least one storage slot receives the at least two prongs of the connector opener, the opening through the connector opener at least partially aligns with the opening through the connector body.

* * * * *